United States Patent [19]
Hotta

[11] Patent Number: 5,511,198
[45] Date of Patent: Apr. 23, 1996

[54] OPTIMIZING COMPILER FOR SHORTENING EXECUTION TIME OF OBJECT PROGRAM

[75] Inventor: KohIchiro Hotta, Kawasaki, Japan

[73] Assignee: Fujitsu Limited, Kanagawa, Japan

[21] Appl. No.: 202,567

[22] Filed: Feb. 28, 1994

[30] Foreign Application Priority Data

Apr. 28, 1993 [JP] Japan ..................... 5-102744

[51] Int. Cl.$^6$ .......................................................... G06F 9/45
[52] U.S. Cl. ..................... 395/700; 364/DIG. 1; 364/280.5
[58] Field of Search ..................... 395/700; 364/DIG. 1

[56] References Cited

U.S. PATENT DOCUMENTS

| | | | |
|---|---|---|---|
| 4,710,872 | 12/1987 | Scarborough | 395/700 |
| 5,202,995 | 4/1993 | O'Brien | 395/700 |
| 5,212,794 | 5/1993 | Pettis et al. | 395/700 |
| 5,287,510 | 2/1994 | Hall et al. | 395/700 |
| 5,293,631 | 3/1994 | Rau et al. | 395/700 |
| 5,339,420 | 8/1994 | Hoxey | 395/700 |

FOREIGN PATENT DOCUMENTS

| | | |
|---|---|---|
| 59-060640 | 4/1984 | Japan. |
| 62-159274 | 7/1987 | Japan. |

*Primary Examiner*—Thomas M. Heckler
*Attorney, Agent, or Firm*—Staas & Halsey

[57] ABSTRACT

An optimizing compiler has a function of determining whether the result of a statement to be executed precedent to a conditional branch statement is not referred to by one destination of the conditional branch statement. If the conditional branch statement is not influenced by the execution result of the precedent statement, the conditional branch statement is shifted in front of the precedent statement, to suppress the execution of the unnecessary statement. Therefore, the optimizing compiler shifts/copies conditional branch statements, to shorten the execution time of an object program.

18 Claims, 3 Drawing Sheets

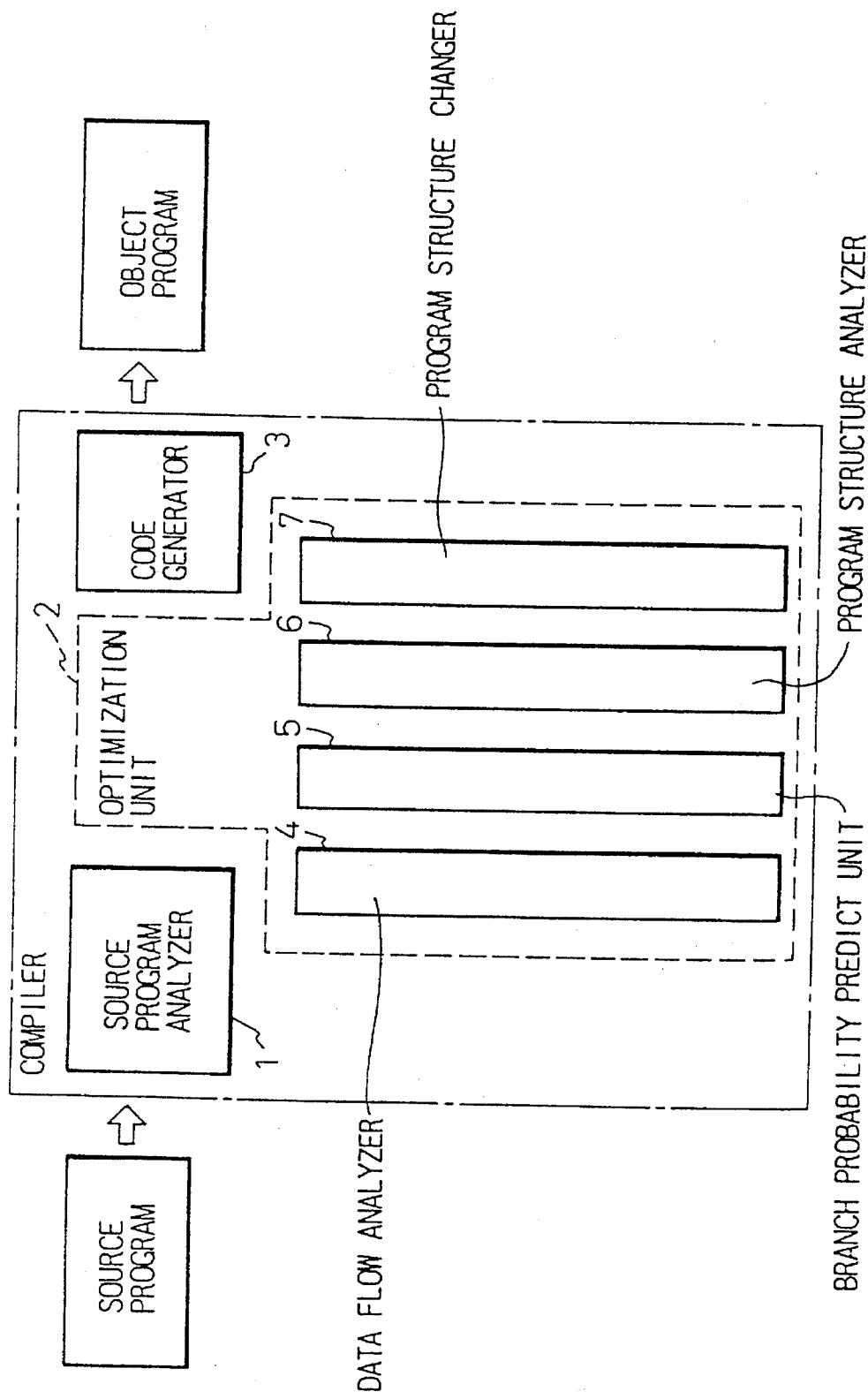

Fig.2

[BEFORE OPTIMIZATION]

```
    W=P*Q                    (1)
    X=Y+Z                    (2)
    IF(A.EQ.0) GOTO 100      (3)
    W=(X+W)/2
100 WRITE(6,*) W
```

[AFTER OPTIMIZATION]

```
    W=P*Q                    (1)
    IF(A.EQ.0) GOTO 100      (2)
    X=Y+Z                    (3)
    W=(X+W)/2
100 WRITE(6,*) W
```

Fig.3

[BEFORE OPTIMIZATION]

```
    DO 10 I=1,N
    A=AA(I)
    B=BB(I)
    IF(A.EQ.X) A=Y           (1)
    IF(A.EQ.X) B=Y           (2)
    IF(B.EQ.B) GOTO 10       (3)
    WRITE  A,B
    GOTO   99
 10 CONTINUE
    STOP
 99 CONTINUE
```

[AFTER OPTIMIZATION]

```
    DO 10 I=1,N
    A=AA(I)
    B=BB(I)
    IF(A.EQ.B) GOTO 10       (3)'
    IF(A.EQ.X) A=Y           (1)
    IF(B.EQ.X) B=Y           (2)
    IF(A.EQ.B) GOTO 10       (3)
    WRITE  A,B
    GOTO   99
 10 CONTINUE
    STOP
 99 CONTINUE
```

OPTIMIZING COMPILER FOR SHORTENING EXECUTION TIME OF OBJECT PROGRAM

BACKGROUND OF THE INVENTION

1. Field of the Invention

The present invention relates to an optimizing method and apparatus for a compiler, and particularly, to an optimizing compiler that compiles a source program language into an optimized assembler language or a machine code.

2. Description of the Related Art

Computer hardware systems have been developed to improve operation speed.

To improve the execution speed of a program, a compiler carries out optimization when compiling the program. Japanese Patent Application No. 4-004869 discloses an optimization technique applicable for optimizing conditional branch statements described in a program. This technique selects instructions to be used, according to the true rate of a corresponding conditional branch statement. This technique is not designed to stop the execution of a statement even if the statement is unnecessary.

Another prior art system moves an invariant conditional branch statement contained in a loop outside the loop, to reduce the number of conditional decisions to be made in the loop. This prior art system aims to reduce the number of conditional decisions to be made in a loop without reducing other operations.

The compiler compiles a source program written in a programming language such as C, FORTRAN, or COBOL into an object program written in a second language such as an assembler language. Optimization carried out by the compiler when compiling the source program into the object program is intended to shorten the execution time of the object program without changing the meaning of the source program. The compiler optimizes the program by integrating the same operations into one or by suppressing unnecessary operations.

When writing a program, a programmer frequently employs redundant operations to simplify the program and assure the correctness of the program. These redundant operations are still left in an object program and elongate the execution time of the program, because conventional compilers do not move or insert conditional branch statements when optimizing the program.

If a program involves a repetition of unnecessary operations, it will slow the execution speed of the program. It is required, therefore, to provide an optimizing compiler that is capable of finding unnecessary operations related to conditional branch statements described in a program and shortening the execution time of the program.

SUMMARY OF THE INVENTION

An object of the present invention is to shorten the execution time of a program by shifting and copying conditional branch statements.

According to the present invention, there is provided an optimizing compiler comprising a source program analyzer for converting a source program written in a first language into intermediate codes, an optimization unit for optimizing the intermediate codes, and a code generator for converting the optimized intermediate codes into an object program written in a second language, wherein the optimization unit includes a data flow analyzer for determining whether one destination of a conditional branch statement does not refer to a result of a statement to be executed precedent to the conditional branch statement; a program structure analyzer for determining whether the conditional branch statement is not affected by the execution result of the precedent statement; and a program structure changer for shifting the conditional branch statement in front of the precedent statement, to suppress an execution of an unnecessary statement. The first language may be a programming language and the second language is an assembler language or a machine code.

According to the present invention, there is also provided an optimizing compiler comprising a source program analyzer for converting a source program written in a first language into intermediate code, an optimization unit for optimizing the intermediate code, and a code generator for converting the optimized intermediate code into an object program written in a second language, wherein the optimization unit includes a data flow analyzer for determining whether one destination of a conditional branch statement does not refer to a result of a statement to be executed precedent to the conditional branch statement; a program structure analyzer for determining, before the execution of the precedent statement, a sufficient condition to branch to the destination that does not refer to the execution result of the precedent statement even if the conditional branch statement is influenced by the execution result of the precedent statement; and a program structure changer for copying the conditional branch statement, to reduce the number of repetitions of the precedent statement.

The optimizing compiler may further comprise a branch probability prediction unit for predicting a probability of the destination of the copied conditional branch statement not referring to the execution result of the precedent statement, the optimization being suppressed if it is predicted that the copying of the conditional branch statement increases overhead. The program structure analyzer may determine the destination of the conditional branch statement according to whether or not two variables in the conditional branch statement are equal to each other, and if the variables are equal to each other, may select the destination that does not refer to the execution result of the precedent statement. The program structure changer may determine, in the precedent statement, whether or not the two variables are equal to respective reference values, and if they are equal to the reference values, may assign other values to the variables. The branch probability prediction unit may predict whether the probability of the two variables being equal to each other is higher before the precedent statement than after the precedent statement.

The first language may be a programming language and the second language is an assembler language or a machine code.

Further, according to the present invention, there is provided an optimizing method for a compiler having a function of determining whether one destination of a conditional branch statement does not refer to a result of an execution of a statement precedent to the conditional branch statement, wherein the optimizing method comprises the step of shifting the conditional branch statement in front of the precedent statement if the conditional branch statement is not affected by the execution result of the precedent statement, to thereby suppress an execution of an unnecessary statement.

In addition, according to the present invention, there is also provided an optimizing method for a compiler having a function of determining whether one destination of a conditional branch statement does not refer to a result of an execution of a statement precedent to the conditional branch statement, wherein the optimizing method comprises the step reducing the number of repetitions of the precedent statement by determining, before executing the precedent statement, a sufficient condition of branching to the destination that does not refer to the execution result of the precedent statement and copying the conditional branch statement, even if the conditional branch statement is influenced by the execution result of the precedent statement.

BRIEF DESCRIPTION OF THE DRAWINGS

The present invention will be more clearly understood from the description of the preferred embodiments as set forth below with reference to the accompanying drawings, wherein:

FIG. 1 is a block diagram showing a principle of an optimizing compiler according to the present invention;

FIG. 2 shows programs before and after optimization according to the present invention;

FIG. 3 shows other programs before and after optimization according to the present invention.

DESCRIPTION OF THE PREFERRED EMBODIMENTS

Figure 4:
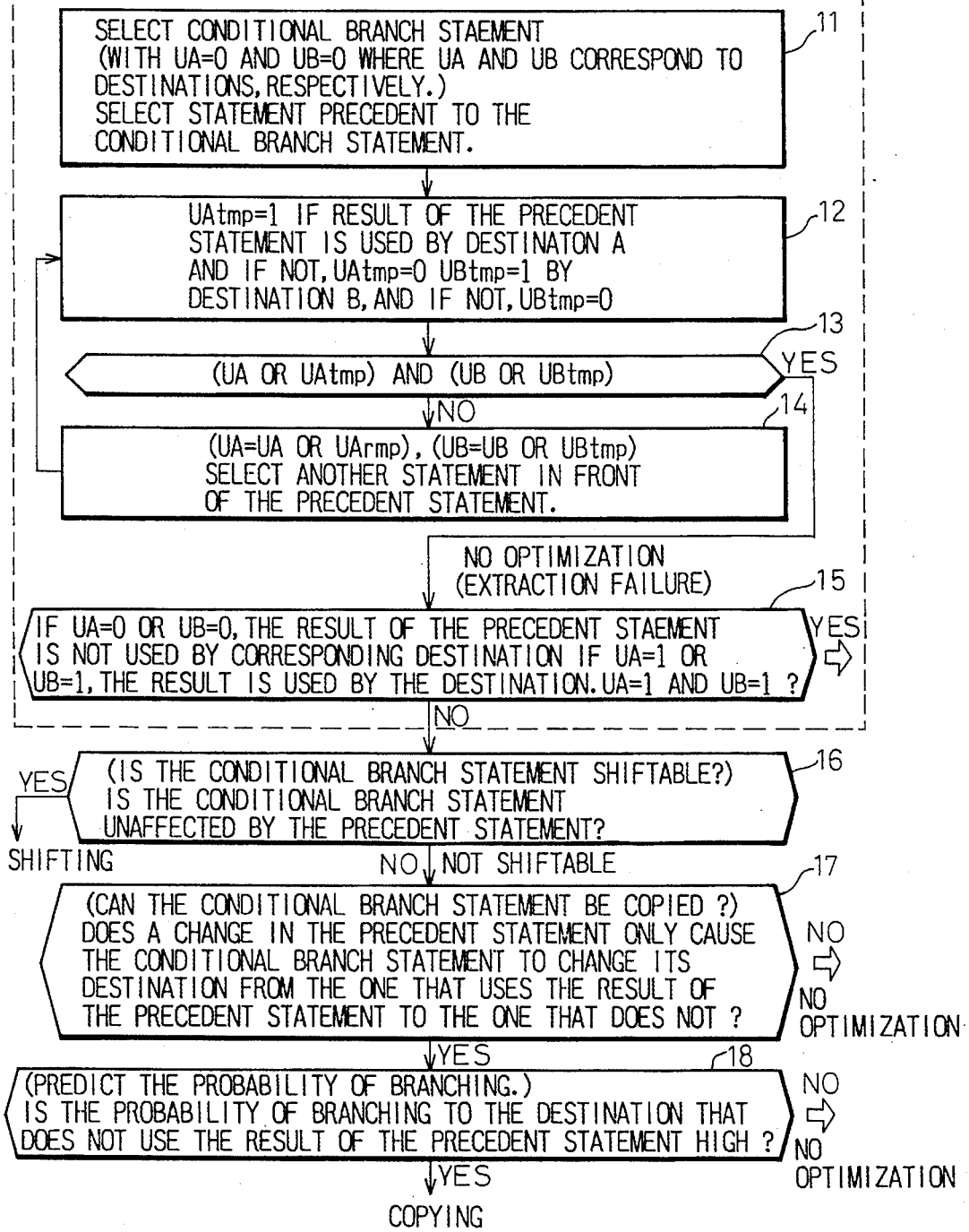
FIG. 4 is a flowchart explaining optimization processes according to the present invention.

An optimizing compiler according to an embodiment of the present invention will now be explained with reference to the drawings.

FIG. 1 is a block diagram showing a principle of the optimizing compiler according to the present invention. The compiler involves a source program analyzer 1, an optimization unit 2, and an object code generator 3.

A source program is written in C, FORTRAN, COBOL, etc. The source program analyzer 1 converts the source program into intermediate code, and the optimization unit 2 optimizes the intermediate code. The code generator 3 converts the optimized intermediate code into an object program written in, for example, an assembler language.

The optimization unit 2 has a data flow analyzer 4, a branch probability prediction unit 5, a program structure analyzer 6, and a program structure changer 7.

The data flow analyzer 4 extracts a conditional branch statement and a statement precedent to the conditional branch statement out of the program.

The program structure analyzer 6 specifies a location to optimize.

The program structure changer 7 optimizes the program by shifting or copying the specified location.

The branch probability prediction unit 5 predicts the probability of each destination of the conditional branch statement in the flow of the program. According to the probability, the specified location is optimized if an improvement in an operation speed is expected. For example, the branch probability prediction unit 5 predicts the probability of the destination of a copy of the original conditional branch statement not referring to a result of the precedent statement. If it is predicted that the copying causes a great amount of overhead, the optimization by copying the conditional branch statement is not carried out.

Instead of prediction of the probability by the branch probability prediction unit 5, an operator may externally provide the branch probability prediction unit 5 with branch conditions for optimizing a specified location.

Statements precedent to the conditional branch statement are selected one after another starting just before the conditional branch statement toward the upstream side of the program. Each precedent statement is selected such that a result of the execution of the statement is not required by at least one of the destinations selected by the conditional branch statement. For this purpose, it is necessary to determine whether or not values changed by the precedent statement are used by the destinations. This sort of information is stored in the data flow analyzer 4.

FIG. 2 shows examples of programs before and after optimization according to the present invention. FIG. 3 shows other examples of programs before and after optimization according to the present invention. These programs are written in FORTRAN. In practice, however, the optimized programs in FIGS. 2 and 3 are written in intermediate code or assembler language. Only for the sake of easy understanding of the difference between before and after optimization, the optimized programs are expressed in FORTRAN in the figures.

The program of FIG. 2 before the optimization involves statements W=P*Q (1), X=Y+Z (2), and IF(A.EQ.0) GOTO 100 (3).

The statement (1) assigns a value to the variable W (W=P*Q). This variable W is referred to by every destination to be selected by the conditional branch statement (3).

The statement (2) assigns a value to the variable X. The variable X is not referred to when A=0 in the statement (3) to jump to the statement 100 (GOTO 100).

The data flow analyzer 4 extracts the conditional branch statement (3) and the statement (2) precedent to the conditional branch statement. The program structure analyzer 6 specifies a location (the statement (2)) to optimize. The program structure changer 7 shifts the conditional branch statement (3) in front of the statement (2) so that the optimized program has a sequence of W=P*Q (1), IF(A.EQ.0) GOTO 100 (3), and X=Y+Z (2).

Before the optimization, the statements (1) and (2) are executed even if A=0 in the statement (3). After the optimization, only the statement (1) is executed and the statement (2) is jumped if A=0 in the statement (3), to thereby shorten the execution time of the program.

In this way, this embodiment finds a statement precedent to a conditional branch statement and tests the validity of shifting the conditional branch statement. If it is determined that the conditional branch statement is not affected by a result of the execution of the precedent statement, the embodiment shifts the conditional branch statement in front of the precedent statement.

If the conditional branch statement is affected by the execution result of the precedent statement, it is determined whether the execution result is not referred to by the destination of the conditional branch statement and by the destination of a copy of the conditional branch statement inserted in front of the precedent statement. Only when the execution result of the precedent statement is not referred to by the destination of the conditional branch statement when the execution result is not referred to by the destination of the copy of the conditional branch statement, is it possible to insert the copy in front of the precedent statement.

When the conditional branch statement is copied just before the precedent statement, a large amount of overhead will be caused to elongate the execution time of the program if the probability of the destination of the copied statement not referring to the execution result of the precedent statement is low. To surely improve the execution speed, the branch probability prediction unit 5 predicts the branching probability of the conditional branch statement according to the execution profile information of the program and the internal statuses of the precedent statement.

The program before optimization of FIG. 3 involves a sequence of statements IF(A.EQ.X) A=Y (1), IF(B.EQ.X) B=Y (2), and IF(A.EQ.B) GOTO 10 (3). The statements (1) and (2) are precedent to the conditional branch statement (3). Since the variables A and B are updated, the conditional branch statement (3) must not be shifted.

It is understood, however, if A=B just before the statement (1), A=B just after the statement (2). Accordingly, the conditional branch statement (3) can be copied. Namely, a copy (3)' of the conditional branch statement (3) can be inserted just before the statement (1).

If a loop shown in FIG. 3 is repeated many times, the probability of exiting from the loop due to the conditional branch statement will be low. Namely, only when the copied conditional branch statement frequently provide FALSE (not branching), and the original conditional branch statement (3) also provides FALSE to repeat the loop, the copying of the conditional branch statement increases overheads to slow the execution speed of the program.

In FIG. 3, the execution speed of the program will be slowed if (A=X and B=Y) or (A=Y and B=X) just before the statement (1). The probability of this, however, is lower than the probability of A=B just before the statement (1). Accordingly, the conditional branch statement (3) is copied as (3)' just before the statement (1), to optimize the program and improve the execution speed thereof.

The program structure changer 7 copies the conditional branch statement just before the precedent statement. If it is required only to shift the conditional branch statement, the program structure changer 7 deletes the original conditional branch statement.

In this way, the present invention analyzes the meaning of a source program and shifts/copies conditional branch statements, to thereby generate an object program that is executable at high speed.

FIG. 4 is a flowchart showing optimization processes for a compiler according to the present invention.

In the figure, step 11 extracts a conditional branch statement with initial conditions of UA=0 and UB=0. The UA and UB correspond to destinations of the conditional branch statement, respectively. Conditional branch statements in a program are selected one by one according to a flow of the program, and a statement precedent to the selected conditional branch statement is examined. These statements are written in intermediate codes.

Step 12 determines whether or not a value to be updated by the precedent statement is used by the destinations A and B of the conditional branch statement. If the value is used by the destination A, UAtmp=1, and if not, UAtmp=0. If the value is used by the destination B UBtmp=1, and if not, UBtmp=0.

Step 13 determines whether or not "(UA or UAtmp) and (UB or UBtmp)." If the step 13 determines that at least one of the destinations A and B is 0, step 15 is carried out. If the step 13 determines that each of the destinations A and B is 1, step 14 is carried out.

The step 14 carries out "(UA=UA or UAtmp), (UB=UB or UBtmp)" and selects a statement in front of the precedent statement. Then, the flow returns to the step 12.

The step 15 examines values assigned to the variables UA and UB. If the variable UA or UB is 0, the destination corresponding to the variable does not refer to the execution result of the precedent statement, and if it is 1, the corresponding destination refers to the execution result. If the step 15 determines that each of the UA and UB is 1, optimization is not carried out. If the step 15 determines that at least one of the UA and UB is 0, step 16 is carried out.

The step 16 determines whether or not the conditional branch statement must be shifted. Namely, this step determines whether or not the conditional branch statement is affected by the execution result of the precedent statement. If it is not affected, optimization is carried out by shifting the conditional branch statement. If it is affected, step 17 is carried out.

The step 17 determines whether or not the conditional branch statement must be copied. Namely, this step determines whether or not a change in the execution result of the precedent statement results only in changing the destination of the conditional branch statement from one that refers to the execution result of the precedent statement to another that does not refer to the execution result. If the step 17 provides YES, step 18 predicts branching probability. If the step 17 provides NO, optimization is not carried out.

The step 18 predicts the branching probability by determining if the probability of branching to the destination that does not refer to the execution result if the precedent statement is high. If it is high, the conditional branch statement is copied just before the precedent statement. In the step 18, an operator may externally enter data for the branching probability.

If the step 18 determines that the probability of branching to the destination that does not refer to the execution result of the precedent statement is low, the optimization is not carried out. In this case, the source program compiled into the intermediate codes by the compiler is not optimized but converted as it is into an object program.

As explained above in detail, the optimizing compiler according to the present invention shifts/copies conditional branch statements that frequently appear in a program, to suppress unnecessary operations, thereby shortening the execution time of a compiled program.

Many different embodiments of the present invention may be constructed without departing from the spirit and scope of the present invention, and it should be understood that the present invention is not limited to the specific embodiments described in this specification, except as defined in the appended claims.

I claim:

1. An optimizing compiler comprising:

a source program analyzer for converting a source program written in a first language into intermediate codes, said source code having a conditional branch statement;

an optimization unit for receiving said intermediate codes from said source program analyzer and for optimizing said intermediate codes; and a code generator for receiving said optimized intermediate codes from said optimization unit and for converting said optimized intermediate codes into an object program written in a second language, wherein said optimization unit includes a data flow analyzer for determining, from said intermediate codes received by said optimization unit, whether one destination of said conditional branch statement does not refer to a result of a statement to be executed precedent to said conditional branch statement, a program structure analyzer for determining, from said intermediate codes received by said optimization unit, whether said conditional branch statement is not affected by the execution result of said precedent statement, and a program structure changer for shifting said conditional branch statement before the precedent statement in accordance with the determination of said data flow analyzer and the determination of said program structure analyzer, to suppress an execution of an unnecessary statement.

2. An optimizing compiler as claimed in claim 1, wherein said first language is a programming language and said second language is one of the group comprising assembler language and machine code.

3. An optimizing compiler comprising:

a source program analyzer for converting a source program written in a first language into intermediate code, said source code having a sequence of instructions which includes a conditional branch statement;

an optimization unit for receiving said intermediate codes from said source program analyzer and for optimizing said intermediate code; and a code generator for receiving said optimized intermediate codes from said optimization unit and for converting said optimized intermediate code into an object program written in a second language, wherein said optimization unit includes a data flow analyzer for determining, from said intermediate codes received by said optimization unit, whether a destination of said conditional branch statement does not refer to a result of a statement to be executed precedent to said conditional branch statement, a program structure analyzer for determining, from said intermediate codes received by said optimization unit and before the execution of said precedent statement, a sufficient condition to branch to said destination that does not refer to the execution result of said precedent statement even if said conditional branch statement is influenced by the execution result of said precedent statement, and a program structure changer for copying said conditional branch statement to a different position in the sequence of instructions, to reduce the number of repetitions of said precedent statement.

4. An optimizing compiler as claimed in claim 3, wherein said optimization unit further comprises a branch probability prediction unit for predicting a probability of the destination of said copied conditional branch statement not referring to the execution result of said precedent statement, the optimization by said optimization unit being suppressed if the prediction by said branch probability prediction unit indicates that the copying of said conditional branch statement increases overhead.

5. An optimizing compiler as claimed in claim 4, said conditional branch statement including two variables, wherein said program structure analyzer determines the destination of said conditional branch statement according to whether or not said two variables in said conditional branch statement are equal to each other, and if the variables are equal to each other, selects the destination that does not refer to the execution result of said precedent statement, said program structure changer determines, in said precedent statement, whether or not said two variables are equal to respective reference values, and if said two variables are equal to said respective reference values, assigns other values to the variables, and said branch probability prediction unit predicts whether the probability of said two variables being equal to each other is higher before said precedent statement than after said precedent statement.

6. An optimizing compiler as claimed in claim 3, wherein said program structure changer copies said conditional branch statement before the precedent statement.

7. An optimizing compiler as claimed in claim 6, wherein said optimization unit further comprises a branch probability prediction unit for predicting a probability of the destination of said copied conditional branch statement not referring to the execution result of said precedent statement, the optimization by said optimization unit being suppressed if the prediction by said branch probability prediction unit indicates that the copying of said conditional branch statement increases overhead.

8. An optimizing compiler as claimed in claim 3, wherein said first language is a programming language and said second language is one of the group comprising assembler language and machine code.

9. A compiler for optimizing code, the code including a sequence of instructions having a conditional branch statement, the compiler comprising:

a data flow analyzer receiving the code and determining whether a destination of the conditional branch statement does not refer to a result of a statement to be executed precedent to the conditional branch statement;

a program structure analyzer receiving the code and determining whether the conditional branch statement is not affected by the execution result of the precedent statement; and a program structure changer shifting the conditional branch statement before the precedent statement in accordance with the determination of the data flow analyzer and the determination of the program structure analyzer.

10. A compiler for optimizing code, the code including a sequence of instructions having a conditional branch statement, the compiler comprising:

a data flow analyzer receiving the code and determining whether a destination of the conditional branch statement does not refer to a result of a statement to be executed precedent to the conditional branch statement;

a program structure analyzer receiving the code and determining, before the execution of the precedent statement, a sufficient condition to branch to the destination that does not refer to the execution result of the precedent statement even when the conditional branch statement is influenced by the execution result of the precedent statement; and a program structure changer for copying the conditional branch statement before the precedent statement in accordance with the determination of the data flow analyzer and the determination of the program structure analyzer, to reduce the number of repetitions of the precedent statement.

11. A compiler as in claim 10, further comprising:

a branch probability prediction unit predicting a probability of the destination of the copied conditional branch statement not referring to the execution result of the precedent statement, the conditional branch statement not being copied by the program structure changer when the prediction by the branch probability prediction unit indicates that the copying of the conditional branch statement increases overhead.

12. A compiler as claimed in claim 11, wherein the conditional branch statement including two variables, the program structure analyzer
determines the destination of the conditional branch statement according to whether or not the two variables in the conditional branch statement are equal to each other, and
if the variables are equal to each other, selects the destination that does not refer to the execution result of the precedent statement, the program structure changer
determines, in the precedent statement, whether or not the two variables are equal to respective reference values, and
if the two variables are equal to the respective reference values, assigns other values to the variables, and the branch probability prediction unit predicts whether the probability of the two variables being equal to each other is higher before the precedent statement than after the precedent statement.

13. An optimizing method for a compiler which compiles code having a conditional branch statement, the method comprising the steps of:

determining whether a destination of the conditional branch statement does not refer to a result of an execution of a statement precedent to said conditional branch statement; and shifting said conditional branch statement before said precedent statement if said conditional branch statement is not affected by the execution result of said precedent statement, to thereby suppress an execution of an unnecessary statement.

14. An optimizing method for a compiler which compiles code having a sequence of instructions that includes a conditional branch statement, the method comprising:

determining whether a destination of the conditional branch statement does not refer to a result of an execution of a statement precedent to said conditional branch statement;

reducing the number of repetitions of said precedent statement by determining, before executing said precedent statement, a sufficient condition of branching to the destination that does not refer to the execution result of said precedent statement; and copying said conditional branch statement to a different position in the sequence of instructions, even if said conditional branch statement is influenced by the execution result of said precedent statement.

15. An optimizing method as claimed in claim 14, wherein said step of copying copies said conditional branch statement before the precedent statement.

16. An optimizing method as claimed in claim 15, further comprising the steps of:

predicting a probability of the destination of said copied conditional branch statement not referring to the execution result of said precedent statement; and not copying said conditional branch statement if the step of predicting indicates that the copying of said conditional branch statement increases overhead.

17. An optimizing method as claimed in claim 14, further comprising the steps of:

predicting a probability of the destination of said copied conditional branch statement not referring to the execution result of said precedent statement; and not copying said conditional branch statement if the step of predicting indicates that the copying of said conditional branch statement increases overhead.

18. An optimizing method as claimed in claim 14, wherein said conditional branch statement determines whether or not two variables are equal to each other, and said precedent statement determined whether or not each of said two variables are equal to respective reference values, said method further comprising:

when the two variables are equal to each other, selecting a destination that does not refer to the execution result of said precedent statement;

when the two variables are equal to said reference values, assigning another value to the variable; and determining whether a probability of said two variables being equal to each other is greater before said precedent statement than after said precedent statement.

* * * * *